(12) United States Patent
Shah et al.

(10) Patent No.: US 6,947,902 B2
(45) Date of Patent: Sep. 20, 2005

(54) ACTIVE TRANSACTION GENERATION, PROCESSING, AND ROUTING SYSTEM

(75) Inventors: Safwan Shah, San Jose, CA (US); Vali Maskatiya, Atherton, CA (US); Rohan Chandran, Palo Alto, CA (US); Narinder Bajwa, Danville, CA (US)

(73) Assignee: Infonox On The Web, Santa Clara, CA (US)

( * ) Notice: Subject to any disclaimer, the term of this patent is extended or adjusted under 35 U.S.C. 154(b) by 471 days.

(21) Appl. No.: 09/871,996

(22) Filed: May 31, 2001

(65) Prior Publication Data

US 2002/0184103 A1 Dec. 5, 2002

(51) Int. Cl.⁷ .............................................. G06F 17/60
(52) U.S. Cl. ........................................ 705/26; 705/27
(58) Field of Search ............................. 705/10, 26, 27, 705/37, 35; 235/380, 280

(56) References Cited

U.S. PATENT DOCUMENTS

| | | | | | |
|---|---|---|---|---|---|
| 6,014,638 | A | * | 1/2000 | Burge et al. | 705/27 |
| 6,119,933 | A | * | 9/2000 | Wong et al. | 235/380 |
| 6,226,623 | B1 | * | 5/2001 | Schein et al. | 705/35 |
| 6,233,566 | B1 | * | 5/2001 | Levine et al. | 705/37 |
| 6,246,997 | B1 | | 6/2001 | Cybul | |
| 6,260,024 | B1 | * | 7/2001 | Shkedy | 705/37 |
| 6,338,050 | B1 | * | 1/2002 | Conklin et al. | 705/80 |
| 2001/0032115 | A1 | * | 10/2001 | Goldstein | 705/10 |
| 2002/0069079 | A1 | | 6/2002 | Vega | |
| 2002/0087385 | A1 | * | 7/2002 | Vincent | 705/10 |

OTHER PUBLICATIONS

"Computer Assocaitates Ships Jasmine(R)ii, First Intelligent and Integrated eBusiness Platform"; PR Newswire; New York; Apr. 10, 2000.*
"Data mining on the Web"; Web Techniques; San Francisco; Jan. 2000; Dan R Greening.*
"Computer Associates Ships Jasmine(R)ii, First Intelligent and Integrated eBusiness Platform"; PR Newswire; New York; Apr. 10, 2000.*
Screen captures of Computer Associates Web Pages obtained via the WayBack Machine (http//: archive.org) dated May 10, 2000.*
"Computer Associates Ships Jasmine(R)ii, First Intelligent and Integrated eBusiness Platform"; PR Newswire; New York; Apr. 10, 2000 and screen captures of Computer Associates Web Pages obtained via the WayBack Machine dated May 10, 2000.*

* cited by examiner

Primary Examiner—Wynn W. Coggins
Assistant Examiner—R. E. Rhode, Jr.
(74) Attorney, Agent, or Firm—Townsend and Townsend and Crew LLP

(57) ABSTRACT

A method and computer system are provided for interfacing between customers and independent service providers. Customer information and transaction data are collected for transactions that may be divided into at least two subsets, with transactions in each subset being initiated with transaction devices associated with a different independent service providers. For each transaction request, a determination is made which of the independent service providers should receive the transaction request, based on the collected customer information, and it is then transmitted to the determined independent service provider.

30 Claims, 6 Drawing Sheets

ACTIVE TRANSACTION GENERATION, PROCESSING, AND ROUTING SYSTEM

BACKGROUND OF THE INVENTION

The invention relates generally to the field of automated consumer transactions. More particularly, the invention relates to a system and method for processing active consumer transactions.

Currently, automated consumer transactions are generally performed both as passive events and in an isolated fashion. For example, the prototypical automated consumer transaction may be illustrated with an automatic teller machine ("ATM"). An ATM is configured to provide a service to a customer, such as a bank customer, that was once performed exclusively by a human being. This service includes delivering cash to the customer and debiting a specified account, or accepting cash/checks from the customer and crediting the account. The typical ATM performs these functions with a limited sphere of data. First, the ATM is configured to identify the customer by recognizing a magnetic pattern on a card issued by a financial institution and correlating that pattern with a personal identification code ("PIN") entered by the customer at the time of the transaction. Second, the ATM is connected with a database maintained by the financial institution, and updates that database in accordance with the transaction that was performed. Finally, the amount of cash delivered by the ATM is generally limited to a small amount, such as $500.

FIGS. 1(a) and 1(b) illustrate the general functioning of ATM and other systems. Traditionally, as shown in FIG. 1(a), each ATM device 10 was connected with a hard-wired land line to a financial institution 20, with the connections shown by the arrows. In some instances, an individual ATM device may be connected with multiple financial institutions, such as shown for ATM 10-2, or multiple ATM's was connected with a single financial institution. Greater flexibility with the system may be provided by introducing electromechanical switch 30, as shown in FIG. 1(b), to act as a routing mechanism. With the electromechanical switch 30, connections need be made only between individual ATM's 10 and switch 30, and between switch 30 and individual financial institutions 20. Transaction routing is then handled entirely by switch 30.

This arrangement still suffers from some inflexibilities, however, and several features of the ATM transaction illustrate general characteristics of automated consumer transactions. For example, the transaction is passive in the sense that the ATM uses a fixed algorithm to perform its functions. The algorithm lacks the flexibility to accommodate differences among customers and to change its behavior over time with respect to individual customers in any but the most rudimentary way. Performance of the transactions is also isolated since customers are always presented with the same menu of possible transactions. There is no ability for the system to anticipate the needs of customers on an individual basis and to tailor them appropriately. Furthermore, electromechanical switch 30 does no more than make a connection from one point to another, thereby maintaining the isolated character of each ATM device.

These general limitations are also true of other types of consumer transactions, such as sales over the internet. One example is the sale of tickets to an event, such as a theater or sporting event. A customer wishing to purchase such tickets from a stand-alone device or over the internet is typically presented with a series of menus so that he can select the date of the event he wishes to attend and select the seats he wishes to purchase at the appropriate cost. This transaction is also passive and inflexible since it takes no account of past behavior of the customer. The transaction choices are always presented in the same unvarying way, irrespective of who the customer is. Moreover, even though both the ATM transaction and the ticket-sale transaction involve a financial component, they are handled entirely distinctly, with no information from one transaction being used for the other.

More recently, some effort has been made to provide limited flexibility in consumer transactions by automating risk assessments. For example, in U.S. Pat. No. 5,870,721, which is incorporated herein by reference in its entirety for all purposes, an automated system is provided for loan approval. The system collects standard loan-processing information and uses a neural network to make a risk assessment. This risk assessment is used to approve or deny the loan request automatically. While this is a somewhat more active system than is an ATM, for example, it does not particularly tailor itself to individual customers and remains very limited in scope.

There is, thus, a general need in the art for a system for processing consumer transactions that is both active and flexible.

SUMMARY OF THE INVENTION

Embodiments of the invention are thus directed to a method and computer system for interfacing between a plurality of customers and a plurality of independent service providers. Customer information and transaction data are collected for a plurality of transactions that are initiated by at least some of the customers. The plurality of transactions may be divided into at least two subsets, with transactions in each subset being initiated with transaction devices associated with a different independent service providers. For each transaction request, a determination is made which of the independent service providers should receive the transaction request, based on the collected customer information. The transaction request is then transmitted to the determined independent service provider. A customer profile may also be updated on the basis of the customer information and transaction data, thereby providing a comprehensive customer profile. In particular, in one embodiment, the transaction devices for each of the two subsets are associated with an establishment so that the customer profile may comprise information regarding customers of the establishment.

Other embodiments are directed to a method and computer system for conducting a consumer transaction. The computer system is configured for interfacing with a customer. The identity of the customer is confirmed. A list of possible transactions is generated for presentation to the customer. Selections on the list are individually tailored according to a determination of the customer's expected preferences. The determination of the customer's expected preferences is derived at least in part from past transactions executed for the customer with the computer system and at least in part from sources external to the computer system. A request is received from the customer to execute a particular consumer transaction, which is then executed in accordance with the request.

Confirming the identity of the customer in some embodiments comprises comparing stored biometric data for the customer with a biometric feature of the customer. The biometric feature may be the customer's voice or may be a facial feature, among other features. The list of possible transactions may be generated by operating a neural network. The neural network has a layer of input nodes, which are supplied with data, and a layer of output nodes, from which results are transformed according to a transform function. The transform function may be a sigmoid. The neural network may be modified to account for the consumer transaction requested from the customer.

In other embodiments, a method and computer system are provided for authorizing a point-of-sale device to provide cash to a customer. The identity of the customer is confirmed with data entered at the point-of-sale device. A cash request is received from the customer entered at the point-of-sale device. The risk of recovering funds provided to the customer is evaluated by supplying data to a neural network as described above. The point-of-sale device is authorized to dispense cash in accordance with the cash request if the risk is acceptably low. In this way, cash may be dispensed by the point-of-sale device as part of a transaction that is substantially contemporaneous with the cash request.

The computer system in which the methods of the invention may be embodied includes a storage device, at least one communications device, and a processor connected with the storage device and the communications device. The storage device is configured to store data related to customer requests for use by the system. The communications device permits the exchange of data with a remote point-of-sale device. The processor is configured to perform functions that result in execution of the method.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1A:
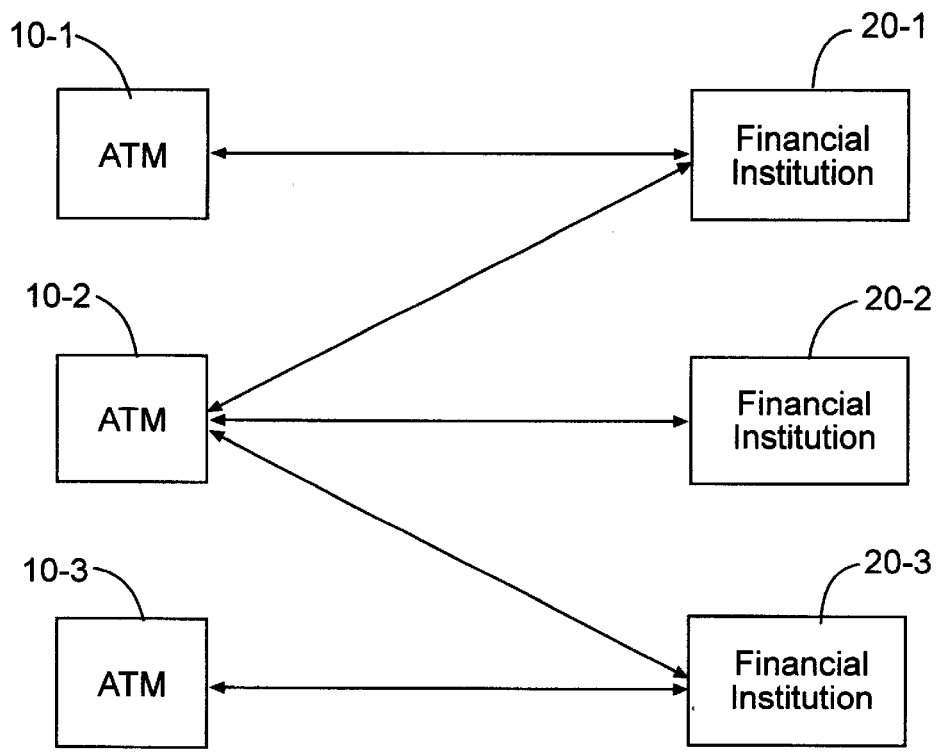
FIGS. 1(a) and 1(b) are schematic diagrams illustrating prior-art connections between ATM's and financial institutions.
Figure 1B:
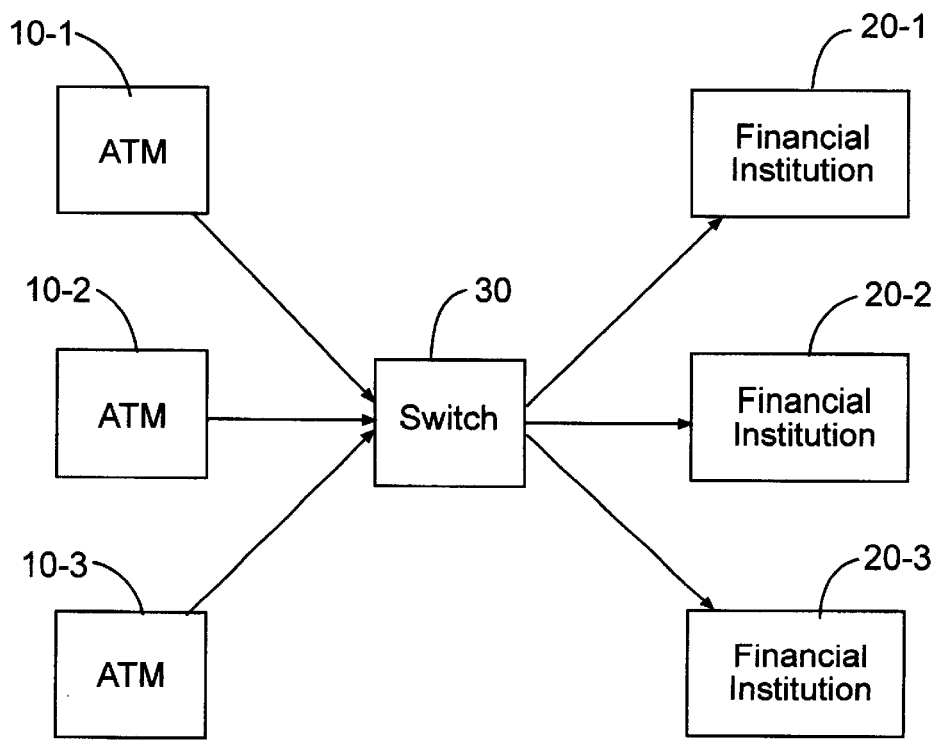

Embodiments of the invention are directed to an adaptive system that may be used to maintain a customer profile, to generate consumer transactions, and to process those transactions. The system is implemented so that otherwise isolated point-of-sale devices may act in concert with each other to generate a comprehensive profile instead of a fragmented profile. The system is adaptive in that it relies not only on external sources of data for generating and processing transactions, but also continually refines its behavior to be more consistent with the expectations of individual consumers. As a particular customer's habits and preferences change over time, so may the behavior of the system to reflect those changes. In one embodiment, the system is also multifaceted, providing a variety of diverse types of transactions to consumers.

1. Active Layer

The performance of these various functions according to embodiments of the invention derives from the operation of an active layer and the manner in which it is configured with respect to service providers, establishments, and customers. As used herein, the terms "service provider" and "establishment" have specific meanings.

A "service provider" is an entity that furnishes the ability for customers to engage in transactions through the use of a remote transaction device. One example of a service provider is a financial service provider, such as a bank, that furnishes the ability for customers to engage in financial transactions with a remote device, such as an ATM. The remote transaction device need not be associated directly with the service provider, but may be associated indirectly. For example, a customer may use a different bank's ATM to initiate a financial transaction with his bank. An "establishment" is defined by an entity or group of entities and a place or group of places, such that the entities and places have at least one common business interest. The place used to define the establishment may be a physical place or may be a virtual place, such as represented by internet web sites where business is conducted.

A number of examples illustrate how the term is used, but are not intended to limit the definition. In one example, the establishment is a casino having a single physical location at which a number of ATM's from different banks are provided. Individual customers in the casino may simultaneously be customers of the casino (establishment) and of one or more of the banks (service providers). In another example, the establishment is a number of affiliated casinos, each being at a different physical location, and each having a number of ATM's from different banks. Because of the affiliation among the casinos, they share a business interest so that the group of casinos qualifies as an establishment. In a further example, the establishment is a shopping mall that includes several independent shops and includes a number of ATM's from different banks. The structure of the mall acts as a common business interest to qualify the shopping mall as an establishment. In a related example, the establishment is a collection of independent malls that have agreed to share customer information, this agreement providing the common business interest. In yet another example, the establishment is a group of affiliated web sites that sell merchandise to customers on credit, with the credit providers acting as service providers.

Embodiments of the invention include an active layer that permits providing an improved customer profile to an establishment or to its component entities. The active layer comprises a functional intermediary between the customers and the service providers so that it can intercept all customer transaction information initiated with devices in the establishment. The general structure of the active layer is illustrated with FIG. 2 and shows how this improved information may be developed by comparing a prior-art structure that lacks the active layer with a structure that includes the active layer. In both cases, an establishment exists that includes a number of transaction devices 108 associated with a plurality of service providers $S_1, S_2, S_3, \ldots$ Customers 104 within the establishment use the transaction devices 108 to perform individual transactions with one or more of the service providers. The customers 104 may thus be identified as belonging to subsets $C_1$, $C_2$, $C_3$, . . . where customers of subset $C_1$ use transaction devices 108 associated with service provider $S_1$.

Figure 2:
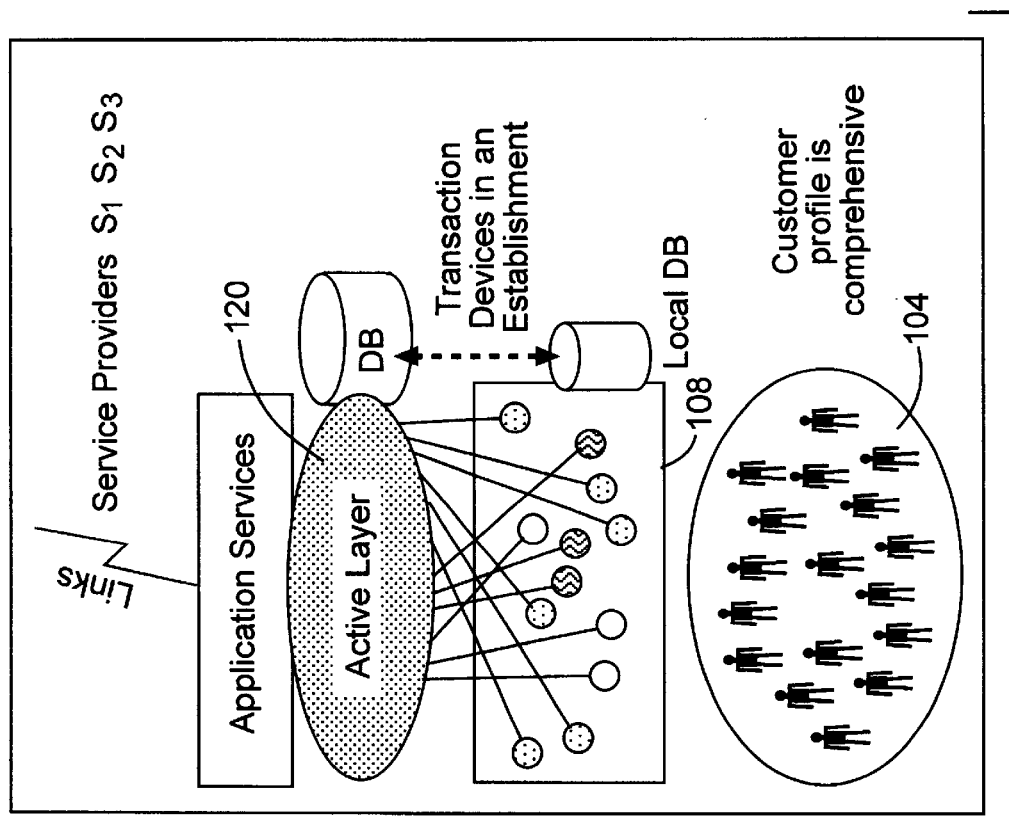
FIG. 2 is a schematic diagram illustrating the operation of the active layer according to the invention.
Figure 2:
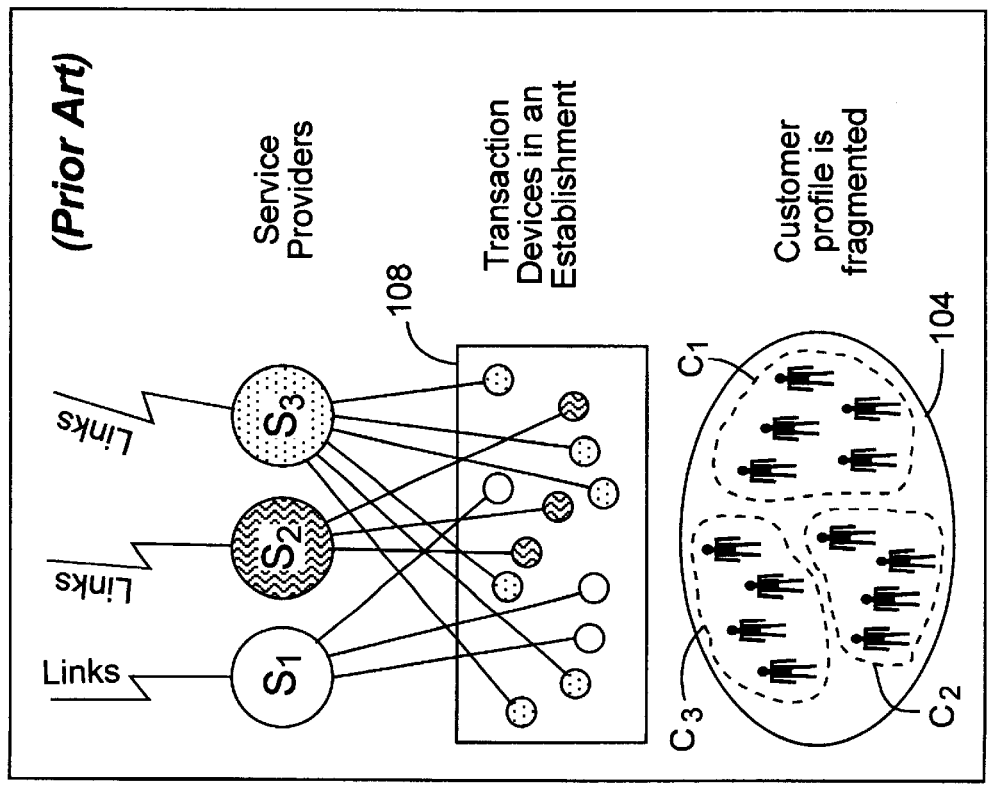

With the prior-art arrangement shown in the left panel, there is no integration of information among the different customer subsets. Each service provider is able to collect and analyze information about the subset of customers that use its transaction devices 108, but this information is not accessible in a way that provides information comprehensively about customers of the establishment. By contrast, the imposition of the active layer 120 as a functional intermediary between the customers and service providers, as shown in the right panel of FIG. 2, provides comprehensive information about customers of the establishment. This is because the active layer 120 is configured so that any transaction device in the establishment presents a transaction request initiated by any of the customers to the active layer 120. The active layer 120 then transmits the transaction request to the appropriate service provider, in addition to other actions that may be taken by the active layer 120 as described below.

Because all transaction requests go through the active layer 120, it is possible to develop a comprehensive profile of establishment customers, rather than the fragmentary profile that is available to an establishment without the active layer 120. As used herein, a customer "profile" refers broadly to categorizations of customers based on one or more characteristics. Such one or more characteristics may include financial and demographic information, among other types. For embodiments where the establishment comprises a plurality of entities, the one or more characteristics may also include information that particular customers interact with certain of those entities.

Thus, in the example where the establishment is a shopping mall, the active layer 120 may collect information regarding the habits of customers of each of the individual shops in the mall. This information may be used for a variety of purposes, such as targeting advertisements for a given shop to certain ATM's in the shopping mall where such advertising is likely to be most effective. The example of a single casino that uses the active layer also illustrates how the active layer permits more comprehensive information. For example, with the active layer in place, it is possible to answer the question "How many customers with bank balances over $50,000 use ATM's in the casino?" This profile information, which is potentially of great value to the casino, is, however, unavailable to a casino using the left-panel configuration shown in FIG. 2.

2. Exemplary Applications

The operation of the active layer may be illustrated with a number of exemplary applications where it forms part of a larger system. Such examples are not intended to be limiting and other applications will occur to those of skill in the art after reading this description.

a. Financial Transactions

Figure 3A:
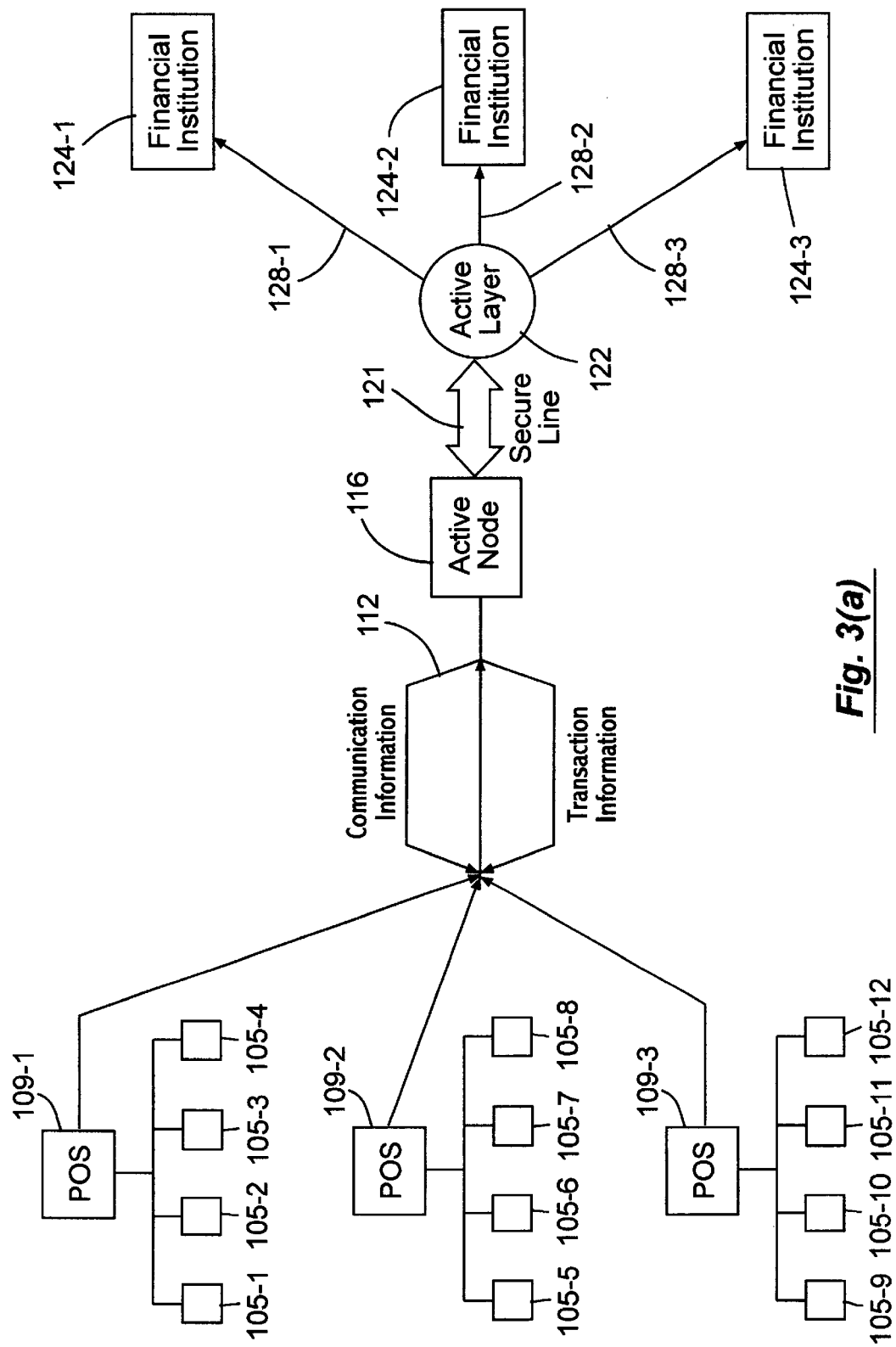
FIG. 3(a) is a schematic diagram providing an overview of one embodiment of the invention.
Figure 3B:
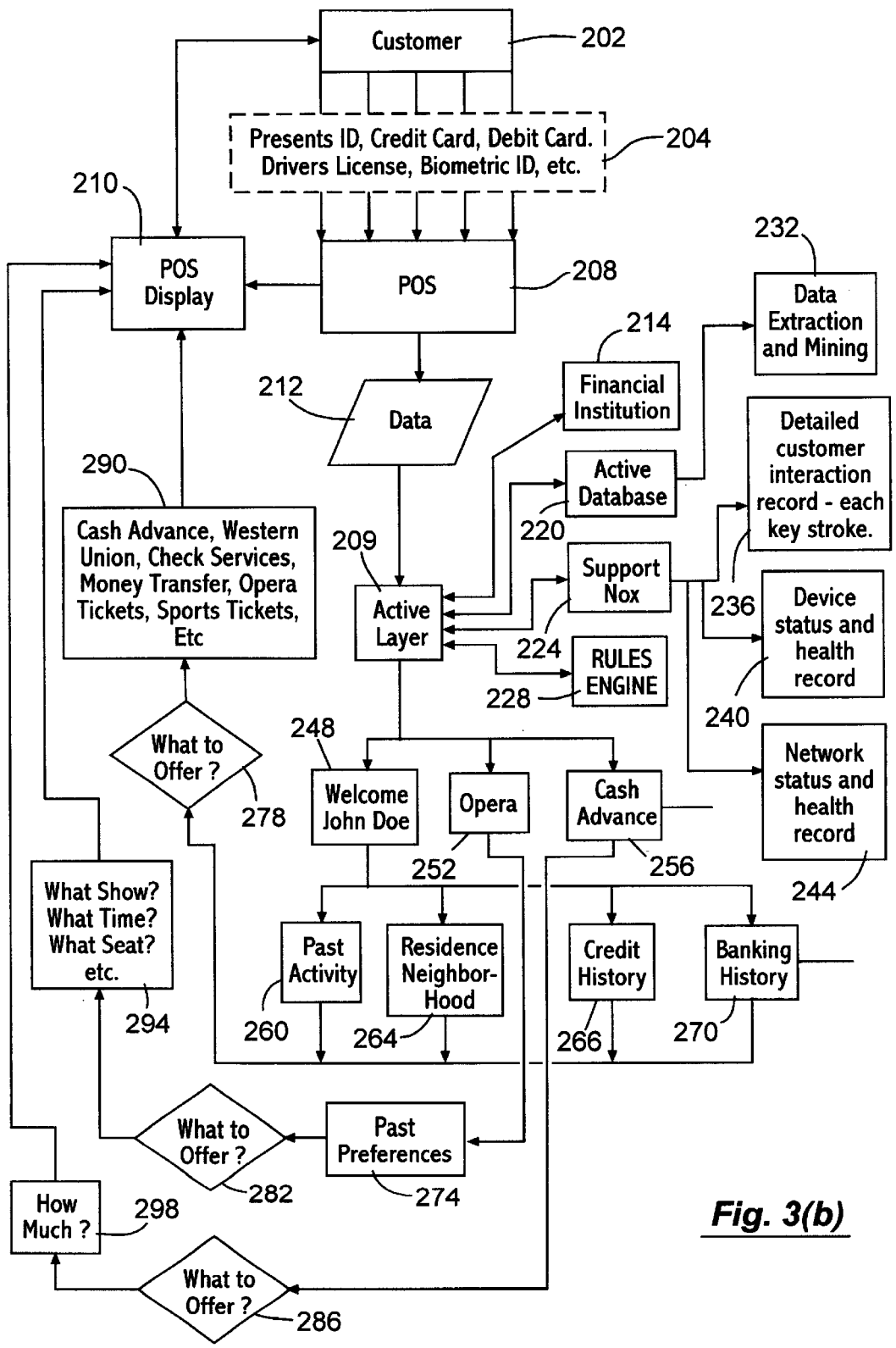
FIG. 3(c) is a schematic diagram illustrating the interconnection of elements in one embodiment of the invention.

A general overview of one embodiment of a system is shown schematically in FIG. 3(*a*) where the types of transactions engaged in by customers are financial transactions. In these embodiments, the active layer is configured to act on transaction requests based on its own risk assessment that the transaction request will be honored by the appropriate financial institution. At one end of the system are customers 105 who interact with point-of-sale devices 109 to perform those various financial transactions. The transaction information is provided to active node 116 over communication network 112. At the other end of the system are financial institutions 124 that interact over financial networks 128 with active layer 122. Active node 116 and active layer 122 are in communication via secure line 121. A request may ultimately be made by the system to the financial institutions to provide funds that have been extended by the system to support a particular transaction. Thus, the system may take a risk that the financial institutions will not honor the request for funds and automatically determines whether to take that risk according to the principles described below. In contrast to an electromechanical-switch arrangement, this configuration permits each point-of-sale device to use information provided from other point-of-sale devices.

For example, in one embodiment, the system for processing financial requests may be configured to provide cash to a customer at a casino (the establishment). Thus, for example, the system of the invention may be integrated with the gaming system described in copending U.S. patent application Ser. No. 09/698,553, filed Oct. 27, 2000 by Kirk Sanford, the entire disclosure of which is herein incorporated by reference for all purposes. The amount of cash a customer requests under such circumstances may frequently exceed a typical ATM or credit-card limit, and such requests may also be made at times when the customer's financial institution is unavailable to process requests quickly. In such an embodiment, the system itself may use a combination of external and internal data to evaluate the risk that the customer's financial institution will ultimately refuse the requested funds. Such refusal may result from numerous causes, including a history of delinquency, insolvency, or that the customer's income does not support the size of the transaction. If the system evaluates the risk to be acceptable, it approves the transaction, and denies the transaction if the risk is too great.

b. Multiple-service Applications

The operation of a system configured to provide multiple types of services to customers may be understood with reference to FIG. 3(*b*), which shows schematically the detailed interaction of different parts of such a system with the active layer. The customer 202 and financial institution 214 still define the ends of the system, although the figure also shows a number of additional external sources of information that may be used. Any transaction with the system begins with customer 202 presenting some kind of identifying information to establish with confidence who (s)he is at block 204. Such identifying information may take the form of a credit card, debit card, driver's license, or other physical item that generally includes a photographic identification. In one embodiment, the physical identifying item is one issued by the system to the customer, but in other embodiments it is any appropriate identifying document. In other embodiments, the customer is identified with a biometric identification. Such biometric identification may use voice recognition, may use facial pattern recognition, or may use other biometric techniques. One such alternative biometric technique is described in U.S. Pat. No. 5,710,833, issued to Moghaddam et al. on Jan. 28, 1998, and which is herein incorporated by reference in its entirety for all purposes. The method described there uses a plurality of eigenvectors derived from facial features for comparison and subsequent recognition.

In order to prevent fraudulent use of the system, the biometric identification may be coupled with a physical item. For example, in the embodiment where the system is configured to provide cash in an establishment such as a casino, the first use of the system by a particular customer may require the customer to have a physical card validated by the casino cashier. The cashier will verify the identity of the customer as part of this initial transaction, but thereafter the system may rely on the combination of the identifying card and biometric data. In this way, the biometric identification acts as a substitute for a PIN, providing increased convenience to the customer by removing the need to remember the PIN or, worse, to record the PIN and risk its theft.

After the system has verified the identity of customer 202 at block 204, customer 202 is provided with access to the system at point-of-sale interface 208. Point-of-sale interface 208 allows interaction between customer 202 and the system through point-of-sale display 210. Data 212 regarding customer 202 is obtained from point-of-sale interface 208 and provided to active layer 209, which generally performs the functions of adaptive transaction generation, processing, and routing.

Active layer 209 may interact with a number of external sources of information. For example, active layer 209 routinely relies on information stored in active database 220. This information is built up over time by the system at block 232 so that it includes both current data and an indication of how that data has varied over time. The data may include, without limitation, personal facts about the customer, such as age, sex, and education level; financial facts, such as income level, bank-account balances, and credit history; behavioral facts, such as spending habits and preferred entertainment activities; and any other facts that may be relevant to the decision-making processes performed by active layer 209.

In addition to this locally collected data, the active layer may be provided with access to a number of externally maintained databases. For example, access to data may be obtained from a service that maintains a list of credit cards that have had credit difficulties in the past; one such entity that provides this service is USA Payments. Another source that may be accessed by the active layer is a service that correlates magnetic-ink character-recognition (MICR) numbers on checks with bank-account balances; such information is maintained, for example, by TeleCheck International, Inc.® A number of services may be accessed that provide credit history when furnished with identification information such as social-security number, name, date of birth, etc.; one example of such a service is Experian Information Solutions, Inc.® Another central credit database is provided by Central Credit, Inc., which maintains credit histories going back as far as forty years. Information regarding customers and credit cards that are to be blocked from receiving credit may be obtained from sources that rely on voluntary or involuntary registration; an example of a voluntary service is provide by STEP and an example of an involuntary service is the Global Cash Access Charge Back System. Postal codes, such as the Zone Improvement Plan (ZIP) codes in the United States, provide information regarding residential location, property value, neighbor behavior, etc.

Active layer 209 is also connected with a support subsystem 224, which is configured to record information about the system. Such information may be used for several different purposes. For example, at block 240, the status and health of individual devices within the system is monitored. If there is an indication that that one of the devices is performing improperly, a system administrator may be notified so that corrective action may be taken. Similarly, at block 244, the status and health of the network is monitored, including the interconnections among various hardware components comprised within the system and including the operation of software to run the system. If such diagnostic monitoring detects a fault with the network operation, the system administrator is similarly notified so that corrective action may be taken.

Support subsystem 224 may also be used to aid in the resolution of disputes that may arise with customers, who may claim that a given transaction was not properly executed. Devices within the system include switches to record every activity of each device, including every keystroke executed by the customer and every item dispensed by the device. This information is continually recorded at block 236 and may be accessed by support subsystem 224. Thus, if a dispute arises regarding a transaction, the interconnection of the support subsystem 224 through the system network with the active layer 209 permits the recorded device information to be accessed easily by the system administrator; there is no need to visit the device itself to extract the information. Accordingly, disputes can be resolved quickly and effectively with the system.

Active layer 209 operates with rules engine 228 to make decisions regarding transactions. Details regarding the operation of rules engine 228 in different embodiments are provided below. Based on the results of applying rules engine 228 to data regarding the identification of a particular customer 202, active layer 209 may generate a menu of possible transaction options tailored for that customer. For example, in the embodiment illustrated in FIG. 3(*b*), the customer is initially presented with a welcome at block 248. Having identified the customer, the system applies the rules of rules engine 228 to generate a menu of suggested transaction options. This is done by considering evaluating the information available from active database 220. In the example shown, the system considers the past activity of the customer with the system at block 260, which is expected to be a good indicator of the types of transactions the customer is interested in pursuing with the system. The system may also consider the character of the customer's residential neighborhood at block 264; this is also expected to be a good indicator of appropriate transactions since it takes advantage of the similarity in behavior by people situated similarly geographically. At block 266, the system may also consider the customer's credit history. At block 270, it may consider the customer's banking history. The system is sufficiently flexible to consider a variety of information sources, only some of which have been described and others of which will be evident to those of skill in the art.

The system uses these various types of information at block 278 to assess what to offer. This assessment may take a weighted form, in that certain transaction options will be offered to a particular customer with a frequency dependent on how likely the system determines the customer wishes to consider those options. Transaction options that the customer is likely to desire will generally be presented more frequently than options the customer is less likely to desire. A number of examples of transactions that the system may offer are indicated at block 290. These include a request for a cash advance, a wire transfer of finds through an institution such as Western Union, a check cashing service, a money transfer service, and transactions for the purchase of opera or sports tickets. Various other transaction options may also be presented.

The transaction options are displayed on point-of-sale display 210 for selection by customer 202. If, for example, customer 202 selects to perform a transaction for the purchase of opera tickets at block 252, the system may consider, in addition to the information already being considered, what past preferences customer 202 has shown for opera tickets at step 274. Such past preferences are deduced from past selections made customer 202 when opera tickets were purchased. Accordingly, with all this information, the system determines what to offer customer 202 at block 282, including specific shows, times, seats, etc. that are likely to be desired by customer 202. At block 294, the system obtains responses from customer 202 needed to process the transaction. Such responses include identification of the show, show time, and seats to be purchased. Processing of the transaction is performed by active layer 209 and includes automatically making reservations and automatically seeking funds for the purchase from the customer's financial institution 214. The purchase of other types of tickets, such as sports tickets, proceeds similarly.

If customer 202 selects to engage in a purely financial transaction, such as obtaining a cash advance at block 256, the decision of what to offer at step 286 includes such aspects as determining repayment conditions and interest rates. At block 298, the system determines the size of the transaction desired. Other types of purely financial transactions are similarly processed by the system.

c. Active Decision Making

Figure 4:
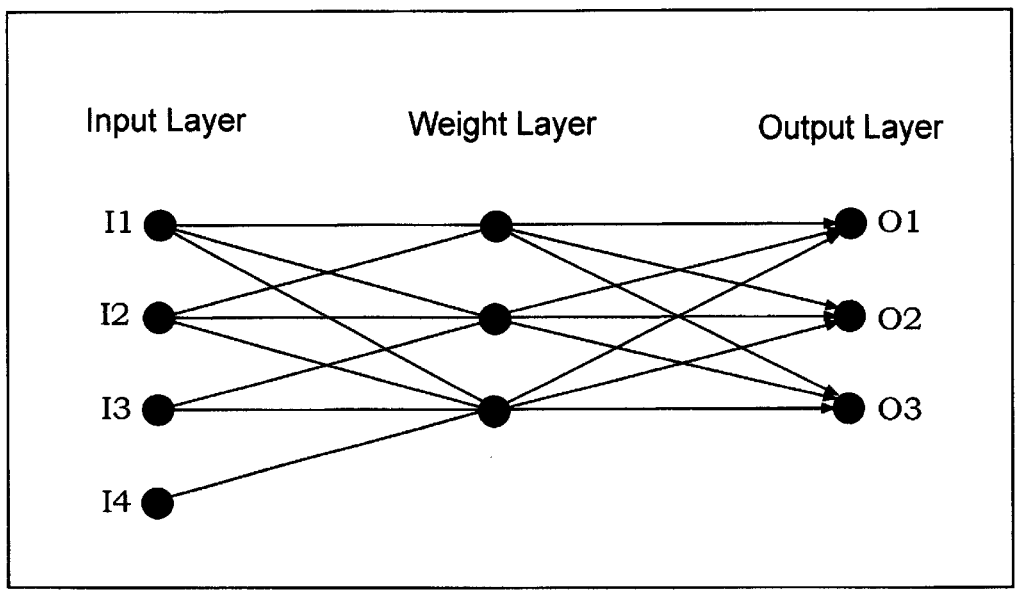
FIG. 4 is an example of the organizational structure of a typical neural network.

Regardless of the type of transaction performed by the system, its generation, processing, and routing are handled in an adaptive manner. In one embodiment, the various decisions, including which options to display, when to display them, and whether to approve the transaction requests, are made by a neural network. A typical neural network includes a plurality of nodes, each of which has a weight value associated with it. A simplified example is shown in FIG. 4. The network includes an input layer having a plurality of input nodes, each of which has a weight value associated with it. The network includes an input layer having a plurality of input nodes Ix and an output layer having a plurality of output nodes Oy, with at least one layer there between. In the simplified example shown in FIG. 4, there are four input nodes I1–I4 and three output nodes O1–O3. The activity of the input nodes Ix represents the raw information that is fed into the network and the behavior of the output nodes Oy represents the interpretation drawn by the network. The intermediate layer acts as a weight layer to assign relative weights to the different inputs from the input nodes Ix.

Figure 5:
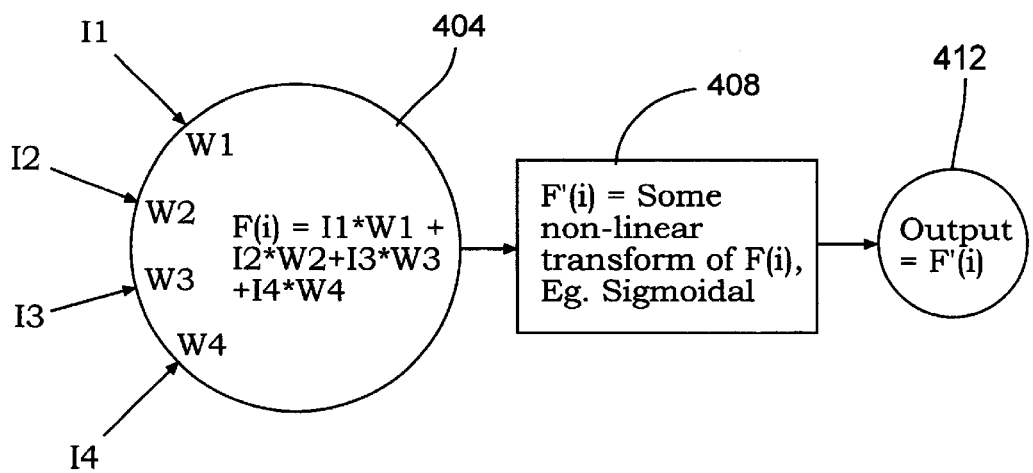
FIG. 5 is a schematic illustration of a possible form of operation of a neural network.
Figure 6:
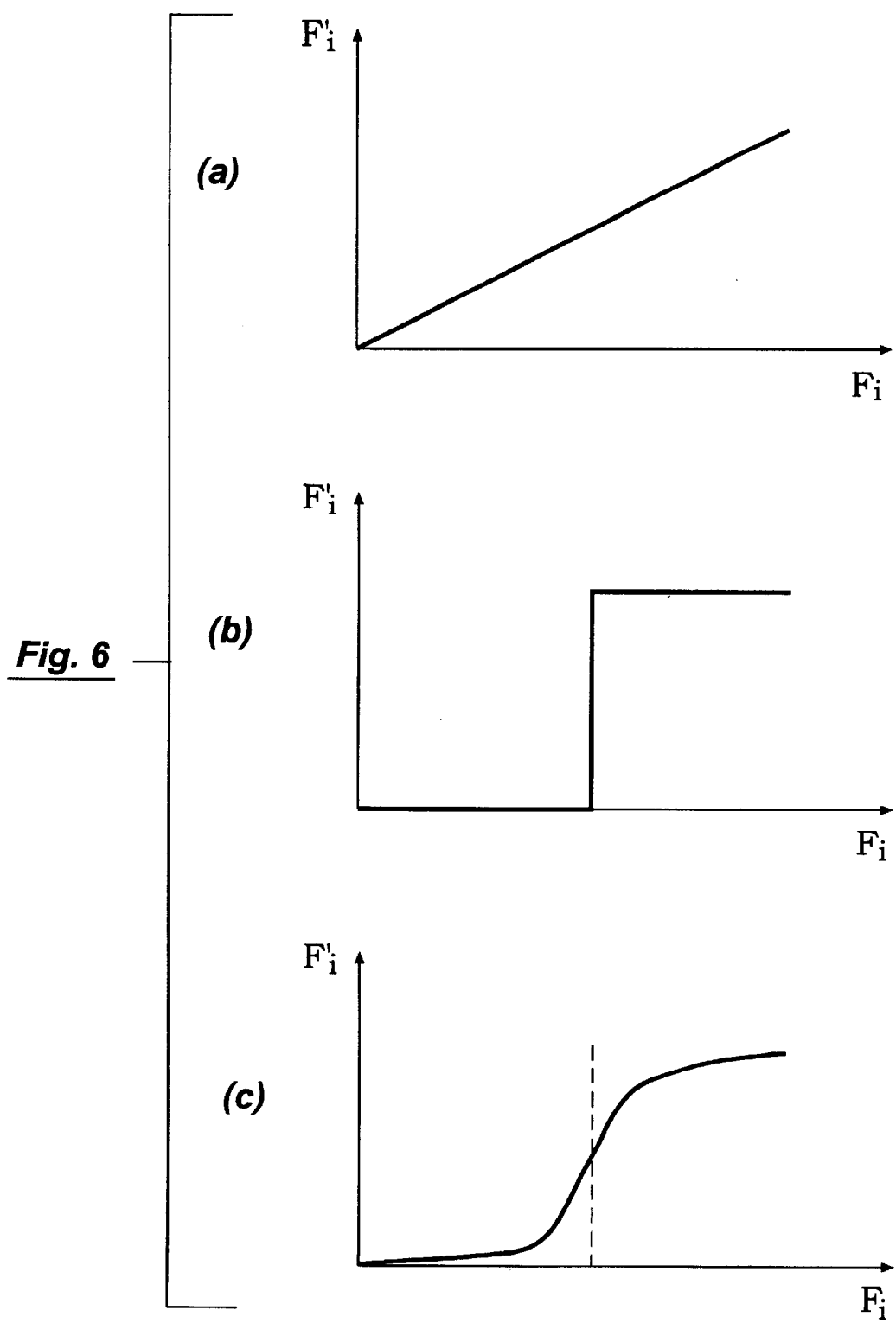
FIGS. 6(a)–6(c) are graphical representations of different transform functions that may be used with a neural network.

This functioning of the neural net is illustrated in FIG. 5, where the linearly weighted sum $F_i = \Sigma I_i w_i$ is calculated for inputs $I_i$ and weights $w_i$ at block 404 and subsequently transformed at block 408 to produce output $F'_i$ at block 412. The transform function (sometimes called a transfer function) typically falls into one of three categories, each of which is illustrated in FIG. 5. The first type of transform function is a linear, or ramp, function $F'_i = \alpha F_i$, in which the output activity is proportional to the total weighted function, as shown in FIG. 6(a). The second type is a threshold function $F'_i = \Theta(F_i - F_i^{(0)})$, where $\Theta$ is a Heaviside step function, illustrated in FIG. 6(b). With this type of transform function, the output activity level takes one of two values depending on whether the total output is greater than or less than some threshold value. The third type of transform, illustrated with FIG. 6(c), is a sigmoid, in which the output activity varies smoothly according to the equation $$F'_i = \frac{1}{1 + e^{-\gamma F_i}},$$

with the sharpness of the transition being governed by slope factor $\gamma$. Of the three types of transforms, the sigmoid is generally most realistic. It arises in many dynamical and biological systems because it is the solution to the first-order differential equation having the form $$\frac{dx}{dt} = kx - \gamma x^2,$$

which describes simple exponential growth dynamics having a linear limiting control.

In order to train the neural net, connections and weights are assigned randomly and output values are calculated for sample input values. The output values are compared against the correct interpretation as it would be made by a human with some known samples. If the output value is incorrect when compared against such a test interpretation, the neural net modifies itself to arrive at the correct output value. This is achieved by connecting or disconnecting certain nodes and/or adjusting the weight values of the nodes during the training through a plurality of iterations. Once the training is completed, the resulting layer/node configuration and corresponding weights represents a trained neural net. The trained neural net is then ready to receive unknown data and develop interpretations for generating, processing, and routing transactions in an adaptive fashion. Classical neural nets include Kohonen nets, feed-forward nets, and back-propagation nets. These different neural nets have different methods of adjusting the weights and organizing the respective neural net during the training process.

The neural net continues to be adaptive as it interacts with customers by using the actual transactions engaged in with customers, with each transaction acting as further training for the network. For example, if the customer ignores the choices offered and asks for additional choices, the weights assigned to the rejected choices can be reduced. As the transaction habits of those customers change over time, so too does the system adapt to those changes, being continually optimized. In the context of the active layer, the neural network is used both for risk evaluation and also for deciding how and where the transaction should be routed, wheat the customer probably desires in the transaction, etc. Based on known parameters about the customer, such as residence locality, neighbor behavior, income bracket, etc., the neural network works out what the appropriate choices to offer the customer are. For example, with a sigmoid transform function, rules engine 228 may assign probabilities of 90% for transactions that the customer performs frequently and 10% for transactions that the customer performs rarely.

A further example illustrates how the neural network may make decisions regarding whether to provide credit and how much credit to provide to a customer. The rules used by rules engine 228 may be generally be established by one of three sources: one of the financial institutions from which funds will be sought, by an administrator of the system, or by a client of the system, such as a casino. The rules generally rely on a scoring system in which some number of points is provided for certain characteristics of the customer—income, credit worthiness, neighborhood, etc. may all be used as inputs to provide a score. The higher the score, the larger the amount available for credit to the customer.

The neural network may be configured to apply nonlinear processing, such as provided by use of the sigmoid transform, to the score generation. Thus, for example, the score may be normalized on a scale from −1.0 to +1.0, with negative scores corresponding to poor credit approval and positive scores corresponding to favorable credit approval. Rather than having a linear weighting where the likelihood of approval is directly correlated with an increase in score, application of the sigmoid transform more accurately tracks human behavior. With a sigmoid transform with a specific slope factor γ, a raw score between −1.0 and −0.6 results in a weighted score close to zero. Raw scores from −0.6 to +0.4 provide rapidly increasing levels of approval with increases in score. Finally, raw scores above 0.5 result in weighted values close to 1.0.

Having described several embodiments, it will be recognized by those of skill in the art that various modifications, alternative constructions, and equivalents may be used without departing from the spirit of the invention. For example, other models of machine learning may be used to substitute for the neural network described above, such as expert systems, fuzzy-logic systems, and systems that use techniques such as genetic algorithms or simulated annealing. Accordingly, the above description should not be taken as limiting the scope of the invention, which is defined in the following claims.

What is claimed is:

1. A method for interfacing between a plurality of customers and a plurality of independent service providers including a first service provider and a second service provider, the method comprising:

collecting customer demographic information and transaction data for a plurality of transaction request initiated by the customers, wherein a first subset of the plurality of transaction request is initiated with transaction devices associated with the first service provider but not the second service provider and second subset of the plurality of transaction request is initiated with transaction devices associated with the second service provider but not the first service provider;

for each transaction request,
 determining which of the plurality of independent service providers should receive the transaction request on the basis of the collected customer information; and
 transmitting the request to the determined independent service provider and developing a customer profile categorizing the customers according to customer demographic information received with the first and second subsets.

2. The method recited in claim 1 further comprising updating the customer profile according to transaction data received with the first and second subsets.

3. The method recited in claim 2 wherein both the transaction devices associated with the first and with the second service providers are associated with an establishment.

4. The method recited in claim 3 wherein the customer profile comprises information regarding customers of the establishment.

5. The method recited in claim 1 wherein at least some of the plurality of independent service providers are financial service providers.

6. The method recited in claim 1, further comprising:
confirming the identity of one of the customers;
generating a list of possible transactions, selections on the list being individually tailored according to a determination of the one of the customer's expected preferences derived at least in part from past transactions executed for the customer with the computer system and from the customer profile; and
presenting the list to the one of the customers.

7. The method recited in claim 6 wherein confirming the identity of the one of the customers comprises comparing stored biometric data for the one of the customers with a biometric feature of the one of the customers.

8. The method recited in claim 7 wherein the biometric feature is the one of the customer's voice.

9. The method recited in claim 7 wherein the biometric feature is a facial feature.

10. The method recited in claim 6 wherein generating the list of possible transaction comprises operating a neural network having a layer of input nodes and a layer of output nodes, wherein operating the neural network comprises supplying data to the layer of input nodes and transforming results provided by the output nodes according to a transform function.

11. The method recited in claim 10 wherein the transform function is a sigmoid.

12. The method recited in claim 10 further comprising modifying the neural network to account for the transaction request initiated by the one of the customers.

13. The method recited in claim 6 further comprising modifying the determination of the one of the customer's expected preferences to account for the transaction request initiated by the one of the customers.

14. The method recited in claim 6 wherein the transaction request comprises a request for advancing funds to the customer.

15. The method recited in claim 14 wherein the funds are advanced in the form of cash.

16. The method recited in claim 14 further comprising evaluating a risk that the advanced funds will be repaid by the consumer.

17. The method recited in claim 16 wherein evaluating the risk that the advanced funds will be repaid comprises operating a neural network having a layer of input nodes and a layer of output nodes by supplying data to the layer of input nodes and transforming results provided by the output nodes according to a transform function.

18. The method recited in claim 6 further comprising recording the transaction request initiated by the one of the customers.

19. A computer system for interfacing between a plurality of customers and a plurality of independent service providers including a first service provider and a second service provider, the computer system comprising:

a storage device configured to store data related to customer transactions;
at least one communications device configured to permit exchange of data with a plurality of transaction devices, wherein a first subset of the transaction devices is associated with the first service provider but not the second service provider and a second subset of the transaction devices is associated with the second service provider but not the first service provider; and
a processor connected with the storage device and the at least one communications device, wherein the processor is configured to:
 collect customer demographic information and transaction data for a plurality of transaction requests initiated by the customers with the first and second subsets;
 for each transaction request,
  determine which of the plurality of independent service providers should receive the transaction request on the basis of the collected customer information; and
  transmit the transaction request to the determined independent service provider and
 develop a customer profile categorizing the customers according to customer demographic information received with the first and second subsets.

20. The computer system recited in claim 19 wherein the processor is further configured to update the customer profile on the storage device according to transaction data received with the first and second subsets.

21. The computer system recited in claim 20 wherein both the first and second subsets of transaction devices are associated with an establishment.

22. The computer system recited in claim 21 wherein the customer profile comprises information regarding customers of the establishment.

23. The computer system recited in claim 19 wherein at least some of the plurality of independent service providers are financial service providers.

24. The computer system recited in claim 29 wherein the processor is further configured to:

confirm the identity of one of the customers with data received over the at least one communications device;

generate a list of possible transactions for presentation to the one of the customers, selections on the list being individually tailored according to a determination of the one of the customer's expected preferences derived at least in part from past transactions executed for the customer by the computer system and from the customer profile.

25. The computer system recited in claim 26 wherein the data received to confirm the identity of the one of the customers comprises biometric data.

26. The computer system recited in claim 25 wherein the biometric data is derived from the one of the customer's voice.

27. The computer system recited in claim 25 wherein the biometric data is derived from a facial feature.

28. The computer system recited in claim 24 wherein the processor is configured to generate the list of possible transactions by operating a neural network to supply data to a layer of input nodes and to transform data provided by a layer of output nodes according to a transform function.

29. The computer system recited in claim 28 wherein the transform function is a sigmoid.

30. The computer system recited in claim 28 wherein the processor is further configured to modify the neural network to account for the transaction request initiated by the one of the customers.

* * * * *